United States Patent
Hurewitz

(10) Patent No.: US 7,021,539 B2
(45) Date of Patent: Apr. 4, 2006

(54) BALLOT SYSTEM AND METHOD ADAPTED FOR OPTICAL SCANNING

(76) Inventor: Joel B. Hurewitz, 1839 S. Washington St., Apt. 309, Naperville, IL (US) 60565

( * ) Notice: Subject to any disclaimer, the term of this patent is extended or adjusted under 35 U.S.C. 154(b) by 36 days.

(21) Appl. No.: 10/359,377

(22) Filed: Feb. 7, 2003

(65) Prior Publication Data

US 2004/0195322 A1    Oct. 7, 2004

(51) Int. Cl.
*G06F 17/60*    (2006.01)

(52) U.S. Cl. ............................ 235/386; 235/491

(58) Field of Classification Search ............... 235/386, 235/491, 375; 283/5; 705/12
See application file for complete search history.

(56) References Cited

U.S. PATENT DOCUMENTS

| | | | |
|---|---|---|---|
| 4,212,393 A * | 7/1980 | Lenkoff ..................... 206/575 |
| 4,479,194 A | 10/1984 | Fogg ........................ 235/386 |
| 4,514,177 A | 4/1985 | Lenkoff ..................... 434/328 |
| 4,578,572 A * | 3/1986 | Hice ..................... 235/462.49 |
| 4,717,177 A * | 1/1988 | Boram ......................... 283/5 |
| 4,807,908 A * | 2/1989 | Gerbel ......................... 283/5 |
| 5,160,266 A | 11/1992 | Landis ...................... 434/328 |
| 5,248,872 A | 9/1993 | Stewart ..................... 235/468 |
| 5,492,558 A * | 2/1996 | Miller et al. .............. 106/31.43 |
| 5,503,665 A * | 4/1996 | Miller et al. .............. 106/31.16 |
| 5,935,308 A * | 8/1999 | Siddiqui et al. .......... 106/31.14 |
| 6,124,377 A * | 9/2000 | Kaiser et al. ................ 523/161 |
| 6,457,643 B1 * | 10/2002 | Way ..................... 235/462.01 |
| 6,581,824 B1 * | 6/2003 | McClure et al. .............. 235/51 |
| 2002/0175514 A1 * | 11/2002 | Warther |

* cited by examiner

*Primary Examiner*—Daniel Stcyr
*Assistant Examiner*—Kimberly D. Nguyen

(57) ABSTRACT

A ballot system including a printed ballot wherein the locations intended for marking voter choices are pre-treated with invisible ink, the remainder of the ballot being untreated; a marking pen containing an activating chemical which makes the invisible ink change to visible and produce permanent marks; and an optical scanning system which detects and tallies the marks made visible by the activation.

1 Claim, 2 Drawing Sheets

ELECTION BALLOT

To vote, darken the oval like this ●. To cast a write-in darken the oval to the left of the blank space and write the candidate's name in that space.

PRESIDENT AND VICE PRESIDENT OF THE UNITED STATES
Vote for one pair

○ Electors for DEMOCRATIC PARTY
AL GORE for
President and
JOE LIEBERMAN
● for Vice President ○ Electors for REPUBLICAN PARTY
GEORGE W. BUSH for
President and
DICK CHENEY
for Vice President

GOVERNOR
Vote for one

○ ERIC "RICK" THORPE Patriot Party

⊙ JOANNE F. WEIL Eagle Party

✗ _____
Write-in

MAYOR
Vote for one

○ NEIL LEVIN Patriot Party

✗ LAURENCE M. POLATSCH Eagle Party
WRONG
○ _____
Write-in

Prior Art
Fig. 1

ELECTION BALLOT

To vote, darken the oval like this ●. To cast a write-in darken the oval to the left of the blank space and write the candidate's name in that space.

PRESIDENT AND VICE PRESIDENT OF THE UNITED STATES
Vote for one pair

[O] Electors for DEMOCRATIC PARTY
AL GORE for
President and
JOE LIEBERMAN
for Vice President

[O] Electors for REPUBLICAN PARTY
GEORGE W. BUSH for
President and
DICK CHENEY
for Vice President

GOVERNOR
Vote for one

[O] ERIC "RICK" THORPE  Patriot Party

[O] JOANNE F. WEIL  Eagle Party

[O] [_____]
Write-in

MAYOR
Vote for one

[O] NEIL LEVIN  Patriot Party

[O] LAURENCE M. POLATSCH  Eagle Party

[O] [_____]
Write-in

Fig. 2

BALLOT SYSTEM AND METHOD ADAPTED FOR OPTICAL SCANNING

This invention relates to election ballots and optical scanning systems for interpreting markings applied to those ballots.

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

There are currently many types of voting systems at use in polling places. One which is gaining favor is a paper ballot on which voters mark their choices in defined areas using a pen or pencil. The marked ballots are then fed into a scanning system which uses optical scanning techniques to detect the marks and tally the votes. These optically scanned ballots have a number of advantages over mechanical or electronic voting machines since the set up requires only delivering the properly printed ballot to the polling site; the tallying can be done by scanning equipment located either, at the site or at a central location; and in the event of a recount, the original ballot which displays the voter's intent in human readable form is available for inspection.

To encourage voter participation, there is a need for a simple way to provide voting for the handicapped, the infirm and others who can not easily get to the polling sites. In addition, there is a desire to increase the number of polling sites and reduce the costs of elections. Optically scanned ballots can help accomplish these objectives because the same printed ballot can be used for off-site voting (such as by mail-in absentees) and at large numbers of polling stations since only an inexpensive writing surface is needed to cast a vote.

For these and other reasons, optically scanned paper ballots are commonly used for political as well as other types of elections. These ballots are simply sheets of paper (or cards) on which are printed the candidate choices, whether it is names of individuals contending for an office or alternative answers to proposals or propositions. They often also contain some printed information or instructions, but their principal feature is that in proximity to each candidate choice there is a predefined area ("marking area") for the voter to fill in. It is this general area which is scanned by commercially available optical scanning equipment, and if the area is marked, the scanner recognizes a vote. These scanable ballots are generally simple to design, cheap to produce, and the optical scanning equipment can easily and rapidly tally the results.

Notwithstanding their general simplicity and wide-spread use, the currently available ballots have a number of shortcomings. The mark made by the voter must of course be sufficient to be detected by the scanner. In political elections the legal objective is to determine the intent of the voter, and to this end most scanning equipment is adapted to reject ballots which contain unclear or insufficient markings. If a ballot is rejected by the scanner, the voting authority has to decide whether to review the rejected ballot manually or to disregard the vote on that ballot.

In an attempt to run an efficient and accurate election, a number of rules are established for ballots which are to be optically scanned. Examples of some common rules are: the area to be marked must be completely filled-in; the mark must be sufficiently dark; and no more than the permitted number of alternative marking areas may be filled-in.

In some cases the design of the ballot is confusing, leading voters to mark areas not indicative of their intended choice, sometimes resulting in valid votes for unintended candidates, but most often when voters fail to abide by the rules, the marks are not recognized as votes at all, leading to the scanning equipment finding "no vote."

An example of a traditional ballot 1 is shown in FIG. 1. Marking areas 11 are usually areas defined by an oval or small rectangle, often called bubbles. The voter is supposed to select one such area and fill it in with a standard pencil or pen. However, voters often incorrectly place a circle 12 around the marking area or underline a candidate's name 13 as shown. When read by the scanner no sufficient mark is found in the scanning zone, which includes all marking areas, and the result is recorded as no vote for that contest. This is tallied as an "undervote." In other cases, instead of blackening the marking area 11, some voters place an "X", shown as 14, across the area. These mis-marked marking areas are also often tallied as undervotes because the "X" does not fill the predefined marking area sufficiently to be detected by the scanner (although in some cases the "X" may leave a mark sufficient to be detected).

The scanning equipment is programmed to look for marks in all of the possible marking areas 11; it does not generally look for marks outside of the marking area but some scanners, such as one disclosed in U.S. Pat. No. 4,479,194 (issued to Fogg, et al on Oct. 23, 1984) do detect the known printing outside the predefined marking areas 11 to calculate the location to be scanned for user marks. Sometimes these extra-area marks are intended by the voter be a vote. These are known as "renegade" marks or bubbles, and often occur when a voter tries to literally follow the instruction "blacken the area next to your choice," but places the mark next to the candidate's name and not in the predefined marking area. These renegade marks are common in United States presidential elections where some states list both the presidential and vice presidential candidate separately, but provide only a single marking area II for the combination of the two. Some voters erroneously insert an extraneous mark (or even two marks), shown as 15, rather than simply filling in the proper area. Ballots with these renegade marks are most often tallied as undervotes by the optical scanner because no mark is placed in a proper marking area 11 for the presidential/vice presidential contest, and hence no mark is found in the predefined marking area for that contest.

When voters realize that they have made a mistake, they should surrender the defective ballot and obtain a substitute, but often they try to correct the error by erasure of the first marking area 11 and placing a second mark in an alternative marking area 11. A resulting smudge is most often detected by the scanner and their intended vote is also detected. The consequence is votes for both alternatives (an "overvote") and a disqualified ballot. Other voters try to correct errors by crossing out their "incorrect" mark, with an "X" 16. This has the effect of creating an overvote when the ballot is also marked in the "correct" marking area. Expecting that the ballots will be read by humans who will interpret their comments, voters will make extraneous marks outside the predefined marking area, such as an "X" over the candidate's name or notations such as "wrong," or "disregard this" 17.

The existence of improperly completed ballots, no matter what the underlying cause, means that many voters are disenfranchised because their mark is not properly interpreted by the scanner. Further, if the voting authority undertakes a manual review of these undervote and overvote ballots, it is unclear what standard can be used to determine voter intent. This causes expense, time, and confusion, and may put in doubt the validity of the election.

Some voting authorities have installed scanning equipment at the polling place. The purpose is to let the voter insert the completed ballot into the scanning equipment and, if an overvote or undervote is detected, reject the ballot and let the voter re-vote to correct the error. This of course, adds significant time and expense to the voting process since it requires that each ballot be passed through an expensive scanner.

No matter how the voting authority deals with ballots rejected by the scanner, existing ballots contain extraneous marks because voters think that marks which they write on the ballot will be seen by the "counters."

It is the object of the present invention to provide a ballot which is immune to extraneous markings, whether intentional or unintentional.

It is a further object of this invention to provide the voter with immediate feedback that a mark within the predefined marking area is preferred, so that the voter has an incentive to fully darken that marking area.

It is a still further object of this invention to provide the voter with immediate feedback that a presumptively valid mark has been made, so that the voter has no incentive to intentionally try to create an improper mark.

Various other features of the present invention will become obvious in light of this disclosure.

BRIEF SUMMARY OF THE INVENTION

The extraneous marks which cause the above-identified problems are eliminated on ballots which accept marks only in the predefined marking areas which the scanning equipment accepts as proper locations for voter marks. When the voter is unable to produce a mark outside of the marking zones, it is more likely that the proper areas will be adequately marked. Further, because the voters will see a distinctive mark in some marking areas, voters will be better able to comply with the instructions.

It has long been known to place invisible ink on paper or other writing surfaces and then to apply a developing chemical which reacts with the invisible ink causing it to become visible. This technology has been used extensively in games, toys and educational products. One example of such a game is described in U.S. Pat. No. 4,514,177 issued Apr. 30, 1985 to Leon G. Lenkoff for "Invisible Ink Quiz Game," and the patents referenced therein describe various elements of the invisible ink art.

The preferred embodiment of the present invention utilizes the invisible ink technology to create a unique ballot advantageously adapted to be read by optical scanning equipment and a voting system and method using such a ballot. The ballot is printed using two types of ink. The names of the candidates, the instructions, and the outlines of the predefined marking areas are printed using conventional ink, and the ballot looks like a pre-existing traditional ballot, as in FIG. 1. The areas within the predefined marking areas are printed using invisible ink. The voter is given along with the ballot a marking pen containing an activating chemical chosen to develop the invisible ink in the marking area so that when overwritten with the activating chemical, it is made visible, but the activator makes no visible mark on the parts of the ballot outside the predefined marking areas. The appearance of a mark in the marking area will encourage the voter to apply more developer to fully fill the marking area. Conventional scanning equipment, such as the Accu-Vote System marketed by Global Election Systems of McKinney, Texas, is capable of detecting and interpreting the developed visible marks, but if the voter applies the developing chemical to any part of the ballot having no invisible ink, no extraneous marks detectable by the scanning equipment will be possible.

When the invisible ink fills the entire predefined marking area the likelihood of a detectable mark will be enhanced, and the voter will get immediate feedback that an appropriate mark has been made. As an alternative, the ballot may also be printed with the invisible ink forming a word, symbol or phrase, within the marking area. This will provide even more information as to the effectiveness of the voter's mark and will further encourage the voter to completely over-write the marking area to be scanned.

BRIEF DESCRIPTION OF THE SEVERAL VIEWS OF THE DRAWING

FIG. 1 is a representation of a traditional scanable ballot used to illustrate erroneous markings thereon; and FIG. 2 is a representation of a ballot in accordance with the invention, showing the predefined marking areas in which the invisible ink is applied.

DETAILED DESCRIPTION OF THE INVENTION

The overall purpose of the balloting system in the political context is to quickly, inexpensively, and accurately allow the voting authority to determine the intent of the voter. The optically scanned ballots are printed paper ballots with areas (usually ovals referred to as bubbles) in which the voter is to darken; the optical scanner simply looks at zones selected to encompass the marking areas on the ballot to determine if a sufficient mark has been made in any of these areas. If so, that area is deemed marked, and a tallying program records the vote for that area.

Voters are notorious for failing to follow directions. When voters circle the name on a ballot rather than marking the associated bubble, the scanning will detect no vote even though the voter intended to vote for the circled candidate. In some cases, voters write notes, such as "wrong" next to a filled in bubble, to indicate that they did not want that vote counted. These clear indications of intent are not tallied by the scanning system.

The ballot 2 shown in FIG. 2 is designed so that it will accept marks with an associated marking instrument only in the predefined areas (such as detection zones 21). This feature will necessarily discourage voters from making extraneous marks since any attempt to write outside the zones 21 will show no mark. In addition, because the application of the developer will produce a mark in the selected area, voters will be encouraged to fill in the marking area completely, thereby avoiding the improper mark 14 in FIG. 1.

The existing technology, known as invisible ink is disclosed in many patents, such as for example, the aforementioned U.S. Pat. No. 4,514,177. This invisible ink technology uses a first chemical placed on a writing surface and a marking pen, containing a second (developer) chemical which, when placed in contact with the first, creates a visible mark, but when placed on untreated paper, makes no visible mark. Once created, the visible mark is essentially permanent. As disclosed in that patent and elsewhere, it is well understood that any one of various formulations for invisible ink can be used. Commonly, a first chemical is a suitable acid or base and a marker containing a corresponding developer is used to make the first chemical visible. The particular formulation is not an essential part of the present invention. The only requirements are that the invisible ink not be detectable by conventional scanning equipment unless the developer has been applied, that the developer alone not be detectable, and that the invisible ink becomes permanently visible essentially upon being contacted by the developer.

The present invention employs this technique by applying the first chemical on the ballot but only in predefined detection zones, each of which is designated to accept a mark indicative of a vote for the corresponding candidate. These detection zones, shown as boxes 21, could be (i) coextensive with the marking area 22, such as conventional bubble areas or circles adjacent the candidates' names, (ii) areas surrounding the marking areas 22, or (iii) the larger areas surrounding and including the candidates' names. The boundaries of the marking areas are printed in regular ink so as to be seen by the voter, and the detection zones 21, surrounding the marking areas 22, are the zones in which the scanning equipment is programmed to look for detectable marks.

The invisible ink is applied within each of the detection zones 21. It is recognized that the boxes are merely representative of all detection zones, and the invention is not limited to any particular shape, nor is it necessary that the invisible ink be applied solely and exclusively within the detection zones 21. What is required is that the invisible ink be applied substantially within the marking areas defined by the regular ink boundaries so that application of the developer will create a visible mark within that boundary; thus, a voter using the marking pen containing the developer will be able to produce visible marks only in the zones containing marking areas, and a ballot prepared in accordance with the invention will not be able to produce visible extraneous writing substantially outside the marking areas such as improper votes 12, 13 or 15 unless the voter employs another instrument (such as a pen or pencil) and not the marker provided. However, it will be possible for the voter to insert a write-in vote with the same marking pen by applying the first chemical to a predefined write-in area 23.

It is possible that in some cases the undeveloped invisible ink will cause a discoloration, such as yellowing, wherever it is applied, but the scanning equipment will not detect that discoloration as a mark. Further, all areas with such application will display the same discoloration and no one area, and hence no specific candidate, will be more distinctive. In fact, a discoloration of the areas to be marked may prove desirable to some voting authorities because this could further define the detection zones 21. Likewise, the application of the developer (from the marking instrument) may discolor the paper but this discoloration will be significantly less than the visible mark made by the combination of the invisible ink and the developer, and any mark made by the developer alone will not be detectable by the optical scanner.

As is evident from the low price of invisible ink games and toys, the marking pens and chemical treatment are very inexpensive, and could be produced by any of the companies presently making these "invisible ink" games. The ballot could be advantageously used on absentee ballots since the mark once made would be permanent and not transferable. Therefore, it would not be degraded by folding or other activities incident to mailing. This is a distinct advantage over punched cards which could arguably dislodge chads in additional locations after the voter had finished voting.

In addition to filling the entire detection zone with invisible ink, the invisible ink could be printed to form a word or mark so that when the developer chemical is applied, the word becomes visible. This is the technique used in some educational games to indicate that the selection chosen is correct. In the voting context, the hidden word or mark could be the candidate's name, the word "yes" or "no," a party symbol, or any other mark appropriate to the item on the ballot. This feature would give the voter the immediate and positive indication of the import of the vote being cast. This would be especially useful in presidential elections when the votes are actually for electors pledged to the president and vice president combined, and many voters try to vote separately. The appearance of both names will satisfy such voters that their intent has been registered.

The present invention could also be implemented using only regular visible ink. In this embodiment the instructions, candidate names and the marking area boundaries are printed in a normal manner. All areas of the ballot, except the marking areas are then coated with a non- porous coating, such as a glossy polymer. The voter could use any marking instrument capable of leaving a mark in the marking areas, but incapable of placing a mark on the coating. Scanning would proceed as in the case of invisible ink ballots.

It is understood that the ballot system of the present invention is intended to be scanned by any generally available optical scanning equipment. In addition to the Accu-Vote system mentioned above, U.S. Pat. No. 4,479,194, issued to Fogg et al. on Oct. 23, 1984 and assigned to Computer Election Systems discloses system which could be employed in accordance with the present invention. The specific features of the reading and tallying system are not themselves element of the invention. The scanning system needs only to detect and record darkened marks located in scanning zones which include the predefined marking areas of the ballot, analyze these readings to determine undervotes and overvotes for particular contests on the ballot, and record the totals of valid votes.

In addition to using the present invention in political and other elections, it may also be used for other purposes such as multiple choice tests, and it is to be understood that the above-described ballot is merely descriptive of the principles of the invention and variations may be devised by those skilled in the art without departing from the spirit and scope of the invention.

What I claim is:

1. A method for casting and tallying votes as indicated on a printed ballot having visibly printed candidate choices and a defined marking area corresponding to each of said candidate choices, each said defined marking area, but no other areas of said ballot, having thereon a first chemical, which upon application of developer chemical produces a visible mark, and at least one certain one of said defined marking areas comprising two physically separate areas, the first separate area being small relative to the second, and the second being adapted to accept a hand-written entry, a visible mark representing said hand-written entry being possible only by manual application of said developer chemical in said separate area, comprising the steps of, manually applying to selected ones of said defined marking areas said developer chemical, which upon contact with said first chemical produces a visible mark within said selected marking areas, optically scanning said ballot to detect and tally all visible marks in all of the defined marking areas on the ballot, and upon detecting a mark in said first separate area of said one certain marking area, separating said ballot for analysis and tallying in accordance with the handwritten entry if one has been made visible by said developer chemical in the second separate area of said one certain marking area.

* * * * *